United States Patent [19]
Demarest

[11] Patent Number: 5,767,972
[45] Date of Patent: Jun. 16, 1998

[54] METHOD AND APPARATUS FOR PROVIDING DATA AGE COMPENSATION IN AN INTERFEROMETER

[75] Inventor: Frank C. Demarest, Middletown, Conn.

[73] Assignee: Zygo Corporation, Middlefield, Conn.

[21] Appl. No.: 658,088

[22] Filed: Jun. 4, 1996

[51] Int. Cl.$^6$ ...................................................... G01B 9/02
[52] U.S. Cl. ............................................ 356/358; 356/345
[58] Field of Search .................................... 356/345, 358, 356/349

[56] References Cited

U.S. PATENT DOCUMENTS 4,688,940  8/1987  Sommargren et al.
5,249,030  9/1993  Field et al.

OTHER PUBLICATIONS

Benedict and Bordner, "Synthesis of an Optimal Set of Radar Track–While–Scan Smoothing Equations*", pp. 27–32 (IRE Transactions on Automatic Control, Apr. 1962).
N. Bobroff, "Recent advances in displacement measuring interferometry", pp. 907–926 (Meas. Sci. Technol. 4, 1993) (no month available).

"HP 10897A High Resolution VMEbus Laser Axis Board", Operating Service Manual, Hewlett Packard Company, Aug. 1993.

*Primary Examiner*—Frank G. Font
*Assistant Examiner*—Robert Kim
*Attorney, Agent, or Firm*—Bryan Cave LLP

[57] ABSTRACT

An improved method and apparatus for compensating for differences in the data age of the measurements among measurement axes in an interferometer (18), such as a heterodyne interferometer, in which known values of time delay occur in the measurement (34, 38, 38a, 41 and 42) and reference signal (44) paths. A time value is measured (52) for the signal transmission over these paths for a given clock (48) period interval and the measured time value (52) is adjusted (56) for the given interval against the known time delay for compensating for the data age. The known time delay is subtracted from the measured time value for providing the adjusted time value (60) for the given interval. The adjusted time value (60) is converted into a phase measurement, and this phase measurement is converted into the dynamic interferometric position measurement (64, 68) for providing a position measurement (72, 74) independent of any velocity of movement of the object whose position is being measured and having reduced data age differences between the signal paths providing the measurement.

20 Claims, 2 Drawing Sheets

METHOD AND APPARATUS FOR PROVIDING DATA AGE COMPENSATION IN AN INTERFEROMETER

FIELD OF THE INVENTION

The present invention relates to methods and apparatus for measuring changes in length or position and for further providing multiple length or position measurements at a precise time. More particularly, the present invention provides enhanced certainty and accuracy in the determination of multiple dynamic positions by substantially reducing the data age differences.

BACKGROUND OF THE INVENTION

The use of interferometry to measure changes in position, length, distance or optical length is well known, see for example "Recent advances in displacement measuring interferometry" N. Bobroff, *Measurement Science & Technology*, pp. 907–926, Vol. 4, No. 9, Sep. 1993 and commonly owned U.S. Pat. No. 4,688,940 issued Aug. 25, 1987. Rapidly increasing demands and needs for higher accuracy determinations of the precise time at which multiple dynamic interferometric position measurements are taken have fueled numerous efforts to reduce and minimize the various sources of uncertainty that are inherent in currently known methods and apparatus. Prior art methods, e.g., commonly owned U.S. Pat. No. 5,249,030 issued Sep. 28, 1993 achieve good accuracy for static measurements or for a single dynamic measurement. For many current applications, e.g., in the step-and-scan photolithography tools used to manufacture integrated circuits, many axes must be measured interferometrically so that all position measurements represent known instants of time. Prior art methods for dynamic measurements provide either paired time and position outputs, e.g., as described in commonly owned U.S. Pat. No. 5,249,030, or interpolated simultaneous position outputs, e.g., the Hewlett-Packard HP 10897A High Resolution VMEBus Laser Axis Board. Both of these prior art methods suffer from differences in the fixed delays in the measurement and reference signal paths. The sources of the fixed delays are: cable lengths, optical path lengths, photoelectric detector delay (which may also vary with light level), circuit delay (which will vary with signal frequency), and phase meter offset, for example. The effects of these fixed delays are differences in the data age of the measurement, i.e., the elapsed time between the event representing the position measurement, and when the position data is available to the user. Compensation for these fixed delays by adjusting one or more of the same fixed delays is generally impractical. Compensation for these fixed delays in the prior art methods requires knowing the velocity of the object whose position is being measured as well as the delay in each measured axis. An inherent limitation with these prior art methods is that the velocity of the object whose position is being measured cannot be measured well enough if the object is moving at a high velocity or undergoing acceleration, e.g., for a measurement accuracy of ±1 nm, compensating for a delay of 50 ns with a position changing at 1 m/s requires an instantaneous velocity measurement accuracy of ±2%.

There is an unmet need for multiple dynamic interferometric distance or position measurements to be made with substantially reduced data age differences.

SUMMARY OF THE INVENTION

The present invention provides a method and apparatus for compensating for time delays in the measurement or reference optical and electrical signal paths in an interferometer. The time delay compensation consists of either or both of two mechanisms. A fine adjustment is performed by adjusting the value representing the measured time of the measurement signal occurrence. A coarse adjustment is performed by increasing or decreasing the number of pipeline delay stages in the signal processing path.

In accordance with the present invention, the phase of the measurement signal with respect to a system clock signal is measured by a counter and delay line interpolator, or other means. The phase measurement mechanism provides a first value as an output representing a fraction of the system clock period where the fraction is usually less than one, although it can be one. Different portions of the processing may use different system clock frequencies related by rational constants, with corresponding changes in the interpretation of the phase measurement, as preferred by the particular implementation. A time delay in the measurement signal path may be canceled by addition of an equivalent negative first adjustment to the first value, producing a second value. A time delay in the reference signal path may be canceled by addition of an equivalent positive second adjustment to the second value, producing a third value. The first and second adjustments are preferably combined into a single third adjustment, resulting in the same third value. The first, second and third adjustments may represent times in excess of one system clock period. The third value represents an adjusted time value with an integer part and a fractional part, and may exceed one system clock period. The third value fractional part is used as the time value for further signal processing. The third value integer part is used to adjust the arrival time of the third value fractional part by logically inserting (for positive values) or deleting (for negative values) the same number of pipeline delay stages in the signal processing path. A constant offset may be added to the first, second, or third adjustment to adjust the range of the third value to be suitable for the range of delay adjustment provided in the signal processing path. These adjustments exactly compensate for the delays in the measurement and reference signal paths, independent of velocity.

Since the reference frequency is precisely known, the measured time intervals are converted to measured changes in phase by arithmetic manipulation. The changes in phase are then summed to provide measured position.

DETAILED DESCRIPTION OF INVENTION

The present invention is directed to an apparatus, preferably an interferometer system and most preferably a heterodyne interferometer system, which is operated for simultaneously measuring, for one or more measurement axes, at each sampling or measurement instant, with accuracy and certainty, both relative changes in position—as for example length or optical length—and the relative time when each sample or position measurement is taken.

Figure 1:
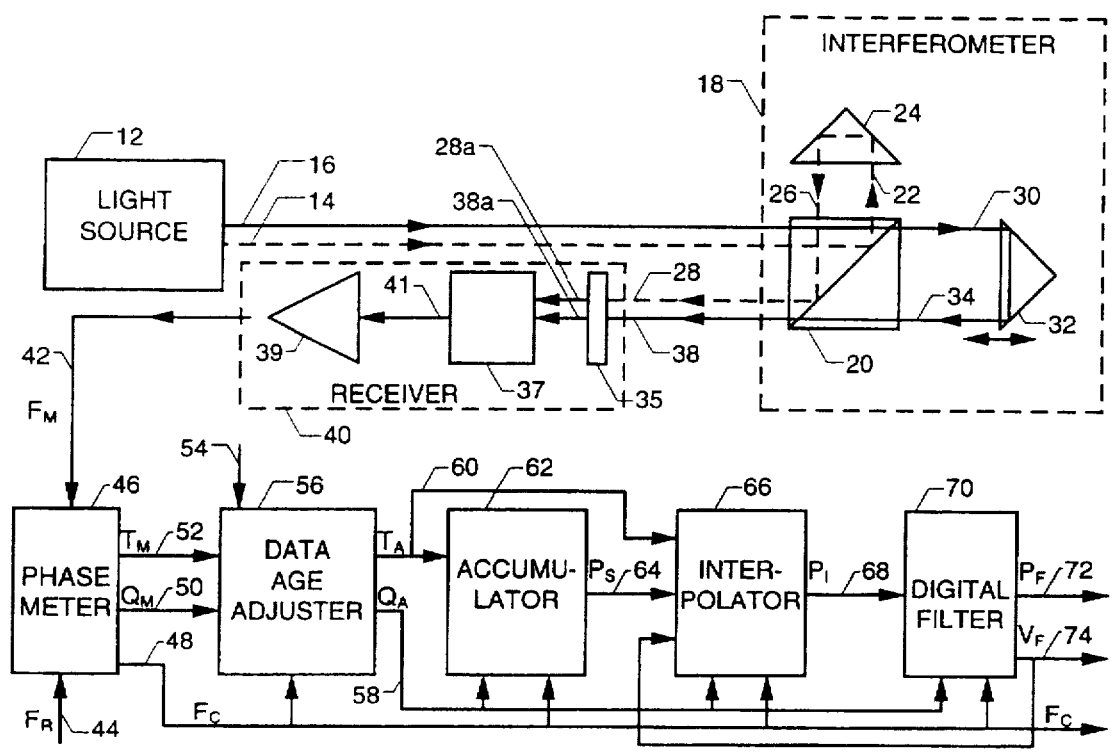
FIG. 1 is an overall block diagram of a presently preferred interferometer system utilizing the preferred data age compensation in accordance with the present invention.

With initial reference to FIG. 1, a preferred heterodyne interferometer system in accordance with the present invention is shown. A light source 12, such as, preferably, a frequency stabilized laser, generates a pair of substantially equal intensity, orthogonally polarized, optical beams 14, 16 that preferably differ in frequency from each other by $f_O$. The optical beams 14, 16 are also, preferably, collinear although they are shown in FIG. 1, merely for clarity and convenience of illustration, as being slightly transversely displaced from each other. The light source may be, for example, as disclosed in commonly owned U.S. Pat. No. 5,249,030 with frequency $f_O$ being, by way of example, preferably on the order of 20 megahertz. The instant invention is not limited to this frequency and may use values substantially lower or substantially higher than the value used here by way of example without departing from the present invention.

The orthogonally polarized optical beams 14, 16 are preferably applied to the interferometer 18 which is preferably configured to measure the length or position of interest. By way of example, the interferometer 18 is shown as a simple linear displacement interferometer in FIG. 1 although the present invention is not limited to only this type of interferometer and can be used with a wide range of types of interferometers, such as, for example, plane mirror, differential, and multiple pass interferometers. In the interferometer 18 shown in FIG. 1, a polarization beamsplitter 20 reflects completely the s polarized light, i.e., light with its polarization vector perpendicular to the plane of incidence, of the incoming beam 14 which is, thereby, reflectedly directed defining beam 22 to a first retroreflector 24. The retroreflector 24 retroreflects the s polarized beam 22 back to the beamsplitter 20 defining beam 26, at which the beam 26 is once again reflected by the beamsplitter 20 to define the output beam 28. Retroreflector 24 is preferably positionally fixed relative to the beamsplitter 20 so as to define a fixed length path through the interferometer 18 that is traversed by beams 22 and 26.

The beamsplitter 20, correspondingly, completely transmits the p polarized light, i.e., light with its polarization vector in the plane of incidence, of the incoming beam 16 which is, thereby, passed through the beamsplitter 20 defining beam 30 to a second retroreflector 32. The retroreflector 32 retroreflects beam 30 defining beam 34 to return it to and once again through the beamsplitter 20 from which it emerges as output beam 38. The output beams 28 and 38 are, as the incoming beams 14, 16, preferably, collinear and orthogonally polarized. Preferably, the second retroreflector 32 is movable or displaceable relative to beamsplitter 20 and in the directions indicated by the arrows in FIG. 1 so as to define a variable length path of the optical beams 30 and 34. Movement or displacement of retroreflector 32 varies the phase of the output beam 38 relative to output beam 28.

The output beams 28, 38 are directed to a conventional receiver 40 which preferably includes a mixing polarizer 35 that mixes the parallel and overlapping portions of the beams 28, 38 to provide each with a component of similar polarization 28a, 38a. The resulting similarly polarized beams 28a, 38a are applied to a photoelectric detector 37 such as a photodiode to produce an electrical measurement or interference signal 41. The electrical signal 41 from the photoelectric detector 37 passes through conventional signal amplification and conditioning circuitry 39 to produce a measurement signal 42 at the receiver 40 output. Preferably the measurement signal 42 has a frequency $F_M$ which is equal to $f_O$ plus the Doppler Shift frequency which is equal to $\pm nv/c$, where v is the velocity of the interferometer element whose position is being measured, c is the velocity of light, and n equals 2, 4, etc. depending on the type of displacement interferometer used. In the example of FIG. 1, the Doppler Shift is produced by the movement of retroreflector 32, and n is equal to 2.

The reference signal 44 is preferably a constant frequency signal with a frequency $F_R$ typically equal to the optical beam difference frequency $f_O$, although a higher or lower frequency which is a rational multiple of $f_O$ may be employed if desired. This signal may be derived from an electrical signal within the light source 12, or it may be generated by directing a portion of the light source 12 optical beams 14, 16 into a receiver similar to the measurement receiver 40.

The reference signal 44 is preferably applied to and used by a phase meter 46 to generate the system clock 48. The system clock 48 is preferably used by related circuitry comprising data age adjuster 56, accumulator 62, interpolator 66, and digital filter 70, to synchronously propagate the data through the various processing functions. Preferably the system clock frequency $F_C$ is a fixed frequency chosen to be greater than the maximum measurement rate of the phase meter 46, and is a rational multiple of $f_O$. By way of example, the frequency $F_C$ may be $2 \cdot f_O$, i.e., on the order of 40 megahertz.

The measurement signal 42 is also preferably applied to the phase meter 46 which measures the time of occurrence of transitions of the measurement signal 42 relative to the system clock 48. Typically, preferably only one signal transition per signal period is measured, for example the rising edge transition, although measuring both transitions per signal period may provide some accuracy improvement and may be employed if desired.

Preferably, on every cycle of the system clock 48, phase meter 46 provides the measured edge qualifier value 50 and the measured time value 52. When a measurement signal 42 edge transition has been measured, the measured edge qualifier value 50 indicates an edge occurred, and the measured time value 52 represents the fractional position of the measured edge within the system clock 48 period. When the measured edge qualifier value 50 indicates an edge has not occurred, the measured time value 52 is irrelevant.

The measured edge qualifier value 50, the measured time value 52, and a data age adjustment value 54, are preferably applied to data age adjuster 56 which preferably produces, as described below, an adjusted edge qualifier value 58 and an adjusted time value 60. The adjusted values may be produced on the same system clock 48 cycle as the corresponding input values, or on a later system clock 48 cycle, as directed by the data age adjuster 56 as will be described in greater detail hereinafter with reference to Table 1. The adjusted edge qualifier logical value 58 is preferably applied to the accumulator 62, the interpolator 66, and the digital filter 70 to enable propagation of only qualified values. This data age adjustment of the measured time values exactly compensates for delays in the measurement or reference signal paths, independent of velocity.

Since physical position, optical phase, and electrical phase are related by known constants, this description will simply refer to position in the discussion that follows. The implemention may preferably use a convenient unit of electrical phase, e.g., 1/512 times the period of $f_O$, as the fractional unit of position.

The adjusted time value 60 is preferably applied to the accumulator 62 which first converts it into a position difference value (not shown). The position difference value is, preferably, calculated from consecutive qualified adjusted time values 60 as shown in Equation 1.

$$\Delta P = M - 1 - C + T_1 - T_2 \qquad \text{Equation 1}$$

Where $\Delta P$ is the position difference value, M is the ratio between the system clock 48 frequency, $F_C$, and the optical difference frequency $f_0$, $T_1$ is the previous qualified time value, $T_2$ is the current qualified time value, and C is the number of system clock 48 periods between the measurement of $T_1$ and the measurement of $T_2$. The arithmetic manipulation to produce the position difference value may be done in any order, as chosen for the convenience of the particular implementation, i.e., as in the presently preferred embodiment described here, or as the equivalent method described in U.S. Pat. No. 5,249,030, without departing from the present invention. The position difference values (not shown) are summed within the accumulator 62 to provide the summed position value 64 which represents the measured position at the instant the measured edge occurred.

The summed position value 64 is preferably applied to interpolator 66 which preferably adjusts the value to represent the measured position preferably at the center of the system clock 48 period, based on the adjusted time value 60 of the measurement and the velocity value 74. The adjusted time value 60 applied to the interpolator 66 is preferably interpreted as a signed fractional value with a range between −½ inclusive and +½ exclusive, thus reducing by one-half the effect of the uncertainty of the velocity value 74 on the interpolation when compared to an alternate method using a fractional value with a fractional range between zero inclusive and 1 exclusive. The velocity value 74 is preferably derived from the velocity output of the preferred implementation of digital filter 70, although other means of providing the estimated velocity may be used without departing from the present invention.

The digital filter 70 preferably smoothes the interpolated position values and provides a filtered position value 72 and a velocity value 74 on every cycle of the system clock 48. Selection of the appropriate constants within the digital filter allows adjusting the performance of the digital filter to suit the application. On a multi-axis system, the digital filter provides the advantage of exact matching of the dynamic response of the filters for all axes simply by selecting identical filter constants. The adjusted edge qualifier value 58 modifies the digital filter 70 operation during those cycles of system clock 48 when there is no new interpolated position value 68, e.g., in the presently preferred implementation, the feedback error value (not shown) within the digital filter is held at its previous value when there is no new interpolated position value 68. The digital filter 70 is preferably a conventional digital filter, such as preferably the type described in IRE Transactions on Automatic Control, July 1962. This filter 70 preferably has the desirable characteristic that there is zero delay between the input values and the output values when there is no acceleration. Other arrangements for digital filter 70 could also be used, if desired, to get equally useful results.

Figure 2:
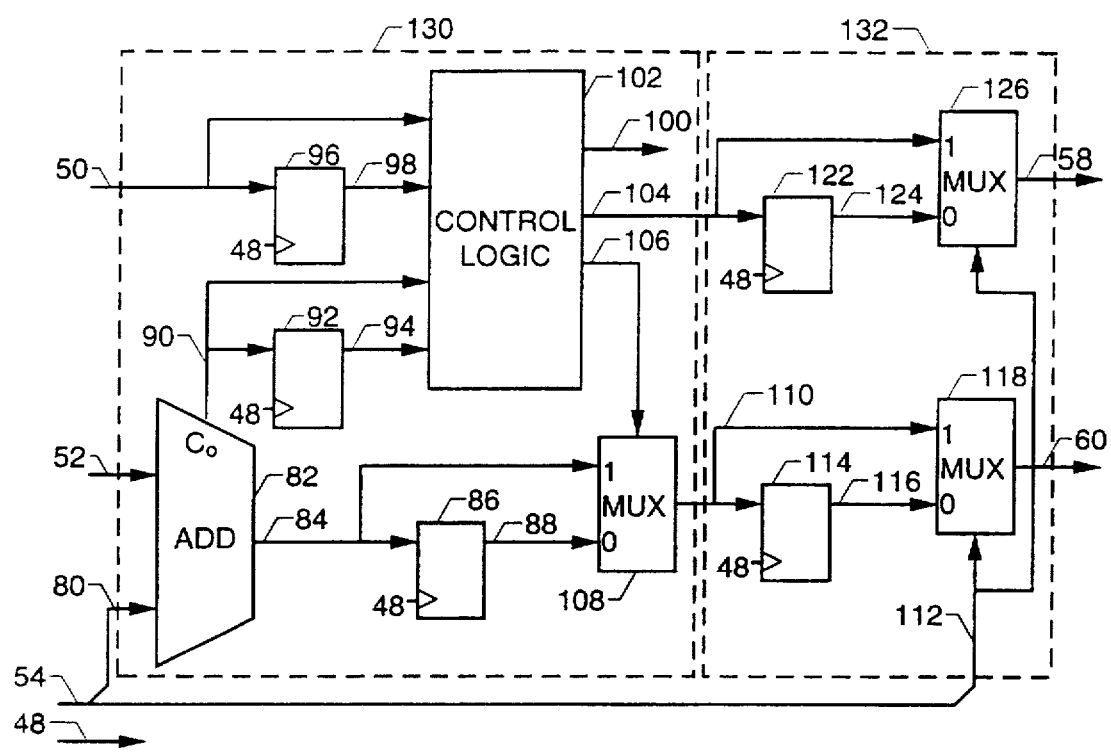
FIG. 2 is a detailed block diagram of the preferred data age adjuster portion of the interferometer system of FIG. 1.

With reference to FIG. 2, the presently preferred data age adjuster 56 is shown. The system clock 48 is preferably applied to delay registers 86, 92, 96, 114 and 122. As shown and preferred, the data age adjustment value 54 is separated into a fractional part 80 and an integer part 112. Preferably, the fractional part 80 and the portion of the data age adjuster 56 representing fractional adjustment circuitry 130 are used to adjust the data age over a range of time less than one system clock 48 period. Preferably, the integer part 112 and the portion of the data age adjuster 56 representing integral adjustment circuitry 132 are used to adjust the data age over a range of time equal to an integral number of system clock 48 periods in integral steps. Preferably, together, the fractional adjustment circuitry 130 and the integral adjustment circuitry 132 allow adjustment of the data age over any desired range with a resolution equal to the measured time resolution. In the presently preferred embodiment shown in FIG. 2, the time value applied to the data age adjuster 56 and the data age adjustment value are interpreted as unsigned positive values, simplifying the implementation and understanding of the function, however either or both of the values may be signed or negative values with suitable changes to the implementation without departing from the present invention.

The measured time value 52 and the data age adjustment fractional part 80 are preferably added together by an adder 82, which produces a sum value 84, and a carry value 90.

Delay registers 86 and 92 preferably retain the previous sum value 88 and the previous carry value 94 respectively. Delay register 96 preferably retains the previous measured edge qualifier value 98.

As further shown and preferred in FIG. 2, the current and previous edge qualifier logical values 50, 98 and the current and previous carry values 90, 94 are applied to control logic 102 which preferably produces the error signal 100, the intermediate edge qualifier value 104, and the output selector value 106.

The operation of the presently preferred data age adjustment fractional adjustment circuitry 130 is summarized in Table 1, with zero and one representing logical states and x representing a state which may be either a zero or a one. In this table and explanation, as an example, a qualifier value of 1 indicates a corresponding valid time value, and a qualifier value of 0 indicates no corresponding valid time value. Referring to lines 1 and 2 of Table 1, when the measured edge qualifier value 50 is 1, indicating a valid measured time value 52 and, therefore, a valid sum value 84; and addition of the time value 52 and the data age adjustment value 80 produces a carry value 90 of zero, indicating no arithmetic carry from the adder 82; the adjusted time value is within the same period of the system clock 48. In this instance, the control logic 102 outputs the intermediate edge qualifier value 104 as 1 to indicate a valid intermediate time value, and output selector 106 causes multiplexer 108 to select the current sum value 84 for output as an intermediate time value 110.

Referring to lines 3 and 4 of Table 1, when the previous edge qualifier value 98 is 1, indicating a valid time value 52 on the previous cycle of the system clock 48, and, therefore, a currently valid previous sum value 88; and the corresponding previous carry value 94 is 1, the adjusted time value during the previous cycle of the system clock 48 is within the current cycle of the system clock 48. In this instance, the control logic 102 outputs the intermediate edge qualifier value 104 as 1 to indicate a valid intermediate time value, and output selector 106 causes multiplexer 108 to select the previous sum value 88 for output as an intermediate time value 110.

Referring to line 5 of Table 1, when the conditions require simultaneous output of the previous time value and the current time value, as described above, an error condition is present. The control logic 102 preferably detects this condition and outputs an error signal 100. This error condition will not occur if the previously stated requirement that the system clock 48 frequency is higher than the highest phase meter measurement rate is met. Under this error condition, the intermediate edge qualifier value 104, the output selector value 106, and, therefore, the intermediate time value 110 are undefined.

Referring to lines 6, 7, 8 and 9 of Table 1, when the conditions described by lines 1 to 5 are not met, the control logic 102 outputs the intermediate edge qualifier value 104 as 0, and the output selector value 106, and, therefore, the intermediate time value 110, are undefined.

The integral adjustment circuitry 132 is preferably used to adjust the data age over a range of time equal to an integral number of system clock 48 periods. The intermediate time value 110 and the intermediate edge qualifier value 104 are preferably delayed by one system clock 48 period by delay registers 114 and 122, respectively, producing delayed values 116 and 124, respectively. The integral data age adjustment value 112 causes multiplexers 126 and 118 to select either the intermediate outputs, or the delayed intermediate values, producing adjusted edge qualifier value 58 and adjusted time value 60. For simplicity, the integral adjustment circuitry 132 is shown only for adjustment of time intervals of one system clock 48 period, although it should be recognized that the same method may be extended to any desired time interval, such as, for example, by cascading sections with delays equal to successive powers of two, i.e., 1 delay, 2 delays, 4 delays, and 8 delays.

While the invention has been described with reference to particular embodiments thereof, those skilled in the art will be able to make the various modifications to the described embodiments of the invention without departing from the true spirit and scope of the present invention. It is intended that all combinations of elements and steps which perform substantially the same function in substantially the same way to achieve the same result are with the scope of the invention.

TABLE 1

| Line | Previous Edge Qualifier 98 | Edge Qualifier 50 | Previous Carry 94 | Carry 90 | Intermediate Edge Qualifier 104 | Output Selector 106 | Intermediate Time Value 110 |
|---|---|---|---|---|---|---|---|
| 1 | 0 | 1 | x | 0 | 1 | 1 | Current |
| 2 | 1 | 1 | 0 | 0 | 1 | 1 | Current |
| 3 | 1 | 0 | 1 | x | 1 | 0 | Previous |
| 4 | 1 | 1 | 1 | 1 | 1 | 0 | Previous |
| 5 | 1 | 1 | 1 | 0 | x | x | Error |
| 6 | 0 | 0 | x | x | 0 | x | — |
| 7 | 1 | 0 | 0 | x | 0 | x | — |
| 8 | 0 | 1 | x | 1 | 0 | x | — |
| 9 | 1 | 1 | 0 | 1 | 0 | x | — |

I claim:

1. In a method for compensating for time delay in either the measurement or reference signal path of an interferometer system due to signal propagation and signal transmission over said paths, wherein said time delay due to said signal propagation and signal transmission is a known value, said time delay causing differences in the data age of said measurements among measurement axis; the improvement comprising the steps of measuring a time value for said signal transmission over said paths for a given clock period interval;

adjusting said measured time value for said given interval with respect to said known time delay for compensating for said data age for providing correction for said time delay, said adjusting step comprising the step of removing said known time delay from said measured time value for said given interval for providing said adjusted time value for said given interval;

converting said adjusted time value into a phase measurement after said time delay corrections for enhancing the accuracy of position measurement with said interferometer; and converting said phase measurement into said dynamic interferometric position measurement for providing said enhanced position measurement independent of any velocity of movement of the object whose position is being measured and having reduced data age differences among said measurement areas.

2. An improved method in accordance with claim 1 wherein said time value measuring step comprises the step of measuring the phase of the measurement signal with respect to a system clock signal for providing a first value related to said system clock period interval for said given interval.

3. An improved method in accordance with claim 2 wherein said phase measuring step comprises the step of measuring said phase using counter and delay line interpolator means.

4. An improved method in accordance with claim 2 wherein said first value is less than or equal to one system clock period for said given interval.

5. An improved method in accordance with claim 2 wherein said adjusting step comprises the step of cancelling said measured time delay in said measurement signal path by addition of a negative first adjustment to said first measured value for producing a second value.

6. An improved method in accordance with claim 5 wherein said adjusting step further comprises the step of cancelling said measured time delay in said reference signal path by addition of an equivalent positive second adjustment to said second value for producing a third value.

7. An improved method in accordance with claim 6 wherein said adjusting step further comprises the step of combining said first and second adjustments into a third adjustment, said third adjustment providing said third value.

8. An improved method in accordance with claim 7 wherein said adjustments represent times in excess of one system clock period for said given interval.

9. An improved method in accordance with claim 8 wherein said third value represents an adjusted time value comprising an integer part and a fractional part, said third value fractional part being useable as a time value for further signal processing, said third value integer part being useable for adjusting the arrival time of said third value fractional part.

10. An improved method in accordance with claim 2 wherein said adjusting step comprises the step of cancelling said known time delay in said reference signal path by addition of an equivalent positive first adjustment to said first measured value for producing a second value.

11. An improved method in accordance with claim 10 wherein said adjusting step comprises the step of cancelling said known time delay in said measurement signal path by addition of a negative second adjustment value to said second value for producing a third value.

12. An apparatus for compensating for time delays in the measurement and reference signal paths of an interferometer due to signal propagation and signal transmission over said paths, wherein said time delay due to said signal propagation is a known value, said time delay causing differences in the data age of said measurements among measurement axes; said apparatus comprising means for measuring a time value for said signal transmission over said paths for a given clock period interval;

means operatively connected to said time value measurement means for adjusting said measured time value for said given interval for compensating for said data age for providing correction for said time delay, said adjusting means comprising means for removing said known time delay from said measured time value for said given interval for providing said adjusted time value for said given interval;

means operatively connected to said adjusting means for converting said adjusted time value into a phase measurement after said time delay corrections for enhancing the accuracy of position measurement within said interferometer; and means operatively connected to said adjusted time value conversion means for converting said phase measurement into said dynamic interferometric position measurement for providing said enhancement position measurement independent of any velocity of movement of the object whose position is being measured and having reduced data age difference between said signal paths providing said measurement.

13. An apparatus in accordance with claim 12 further comprising means for providing a system clock having said clock period, said time value measuring means comprising means operatively connected to said system clock for measuring the phase of said measurement signal with respect to said system clock signal for providing a first value related to said system clock period for said given interval.

14. An apparatus in accordance with claim 13 wherein said adjusting means comprises data age adjustment means for providing an adjusted edge qualifier value and an adjusted time value, said position measurement providing means comprising means for providing a position difference value from consecutive adjusted time values.

15. An apparatus in accordance with claim 14 wherein said interferometer comprises a heterodyne interferometer operable for simultaneously measuring relative changes in opposition for said measurement axes, said position difference providing means comprising means for providing said position difference value in accordance with the expression $\Delta P = M - 1 - C + T_1 - T_2$ where M is the ratio between said system clock frequency and the optical difference frequency in said heterodyne interferometer, $T_1$ is the previous qualified time value, $T_2$ is the current qualified time value, and C is the number of system clock periods between the measurement of $T_1$ and the measurement of $T_2$.

16. An apparatus in accordance with claim 15 wherein said position measurement providing means further comprises accumulator means for summing said position difference values for providing a summed position value.

17. An improved method in accordance with claim 1 wherein said removing step comprises the stop of subtracting said known time delay from said measured time value for said given interval.

18. An improved method in accordance with claim 1 wherein said removing step comprises the stop of adding said known time delay to said measured time value for said given interval.

19. An apparatus in accordance with claim 12 wherein said means for removing said known time delay from said measured time value for said given interval comprises means for subtracting said known time delay from said measured time value for said given interval.

20. An apparatus in accordance with claim 12 wherein said means for removing said known time delay from said measured time value for said given interval comprises means for adding said known time delay to said measured time value for said given interval.

\* \* \* \* \*